United States Patent [19]

Knowles

[11] Patent Number: 5,056,981
[45] Date of Patent: Oct. 15, 1991

[54] DOLLY FOR GROUND TRANSPORT OF A HELICOPTER

[76] Inventor: John B. Knowles, Route 1, Box 134, Blue River, Wis. 53518

[21] Appl. No.: 473,228

[22] Filed: Jan. 31, 1990

[51] Int. Cl.$^5$ ............................................. B64F 1/22
[52] U.S. Cl. .................................. 414/495; 180/19.1; 254/4 R
[58] Field of Search .............. 414/495; 180/19.1, 19.2, 180/19.3, 210; 280/43.12; 254/4 R, 4 B, 4 C, 127; 244/50

[56] References Cited

U.S. PATENT DOCUMENTS

| | | | |
|---|---|---|---|
| 1,391,773 | 9/1921 | Forbes | 254/46 |
| 2,651,498 | 9/1953 | Straub | 254/127 |
| 3,119,502 | 1/1964 | Paul | 414/495 X |
| 3,279,722 | 10/1966 | Glover, Jr. et al. | 244/50 |
| 3,552,556 | 1/1971 | Hall | 414/495 |
| 3,761,040 | 9/1973 | Cummins | 414/495 X |
| 3,880,310 | 4/1975 | Hunziker | 414/495 |
| 3,937,290 | 2/1976 | Benning | 180/14.7 |
| 4,033,422 | 7/1977 | Benning | 414/495 X |
| 4,223,856 | 9/1980 | DiVincenzo | 244/50 |
| 4,486,612 | 12/1984 | Patterson | 180/14.1 |
| 4,516,744 | 5/1985 | Burnside | 244/50 X |
| 4,534,544 | 8/1985 | Heide | 254/127 X |
| 4,576,245 | 3/1986 | Oldani | 180/19.1 X |
| 4,603,869 | 8/1986 | Maxwell | 280/11 |
| 4,629,391 | 12/1986 | Soyk et al. | 180/19.1 X |

FOREIGN PATENT DOCUMENTS

| | | | |
|---|---|---|---|
| 802885 | 2/1951 | Fed. Rep. of Germany | 254/4 B |
| 812631 | 9/1951 | Fed. Rep. of Germany | 180/19.1 |

*Primary Examiner*—David A. Bucci
*Attorney, Agent, or Firm*—Lathrop & Clark

[57] ABSTRACT

A self-propelled helicopter ground handling dolly (10) comprises a central framework on which are mounted two casters (16) and a fixed powered drive wheel (14), a single lifting arm (22) which lifts a lifting framework (22) designed to engage lifting points on the underside of a skid-equipped helicopter (114), a handle (24) offset from the longitudinal center of the dolly (10) to enable maneuvering said dolly (10) into position under the helicopter (114), and a hand held control (102) that permits the operator to control the forward and reverse motion of the dolly (10) and the lifting motion of the lifting arm (22) from a position near the end of the tail-boom (118).

31 Claims, 6 Drawing Sheets

FIG. 5
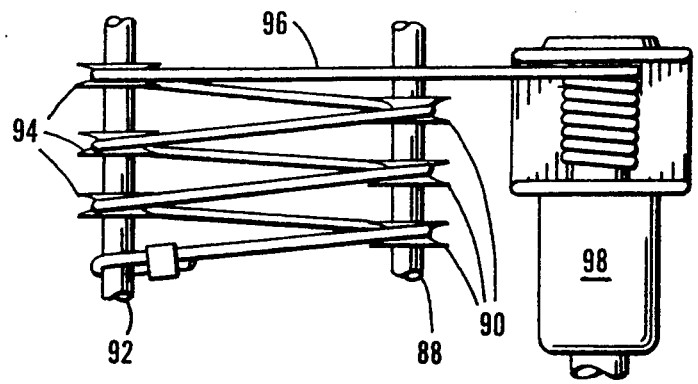
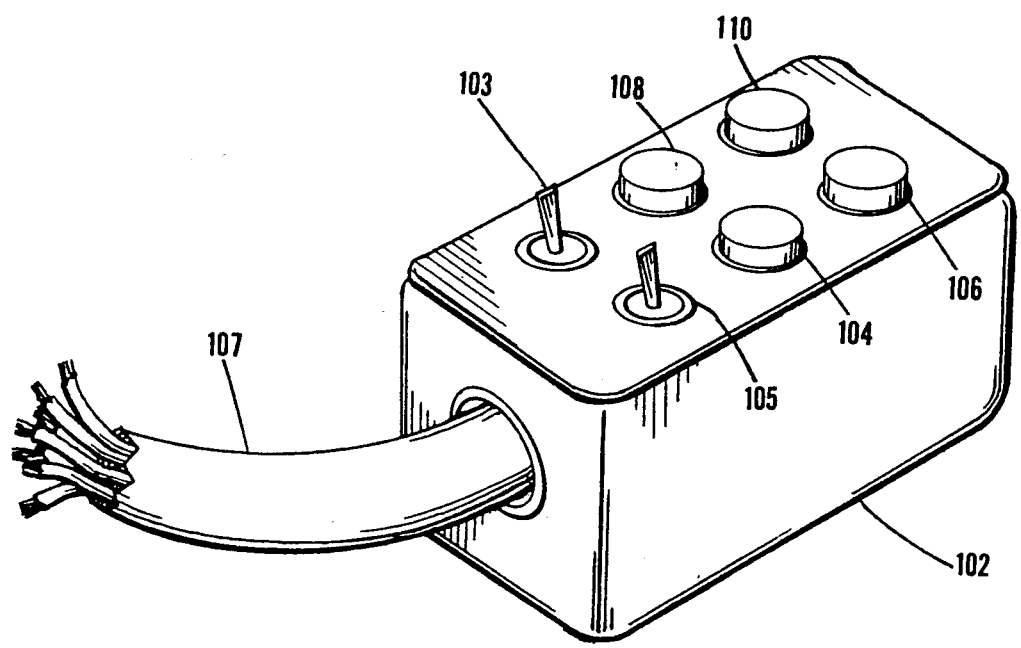
FIG. 6

DOLLY FOR GROUND TRANSPORT OF A HELICOPTER

FIELD OF THE INVENTION

This invention relates to devices used to move skid-equipped helicopters on the ground, and more specifically to self-propelled devices that lift and move helicopters.

BACKGROUND OF THE INVENTION

In order to land on a variety of surfaces, many helicopters are equipped with two parallel skids, extending longitudinally on opposite sides of the helicopter. Moving such helicopters into their hangar or maintenance facility has always been a problem for operators and has resulted in a variety of systems to solve the problem.

The most basic system is to fit the skids with factory supplied wheels and two or more people then balance, maneuver, and roll the helicopter as needed. The disadvantage of this system is that the fitting of the wheels to the skids is time consuming and requires two or more people.

A second system of moving helicopters is to land the helicopters on a rolling platform and tow the helicopter where needed. The disadvantage of this system is the need to tow the device with a power unit. Furthermore, the rolling platform takes up valuable hangar space, presents a more dangerous landing situation, and requires the helicopter to be started up and landed on the platform in order to move the helicopter.

A third system involves a dolly of various configurations that rolls under the helicopter from the front and lifts the helicopter by an apparatus that either slides under the skids, attaches to adaptors on the skids, or engages lifting points on the underside of the helicopter. The dolly lifts the helicopter and is then towed by a separate power unit or is self-propelled, in which case the operator steers from a position in front of the helicopter with a steering arm or handle. Dollies of this type include hardware to stabilize the helicopter and keep the helicopter from teetering on the lifting apparatus. Dollies of this type cannot be used on helicopters with lights or other equipment that are mounted on the underside of the aircrafts since the dollies roll under the aircraft from the front and there is insufficient clearance. Further disadvantages relate to the difficulty of maneuvering the dolly and helicopter when backing up. The operator at the front is a considerable distance from the end of the tailboom. This fact, coupled with the inherent difficulty of backing any four-wheeled vehicle with a conventional steering configuration and the impossibility of pivoting action, makes maneuvering in tight situations, as are often encountered in crowded hangars, very difficult. A further disadvantage of this type of dolly is the problem of insuring that the lifting apparatus is properly aligned with the lifting points on the aircraft. The control for the lifting apparatus, usually mounted on the handle, does not permit the operator a good view of all the lifting points as the apparatus is raised.

A fourth system of handling helicopters on the ground involves devices that directly support the skids, such as U.S. Pat. No. 4,516,744 issued to Burnside, utilizing a caster assembly in the front and a wheel and axle assembly in the rear of the aircraft. Disadvantages of this sytem include the time-consuming nature of positioning the wheel and axle assemblies, and the requirement of a separate power unit for motive power.

SUMMARY OF THE INVENTION

The present invention provides a compact, relatively simple system for moving skid-equipped helicopters by one person. The improved self-propelled lifting dolly consists of a central T-shaped frame that is supported by at least two swivel casters and a single powered drive wheel. The central framework carries a lifting arm capable of lifting an adjustable lifting framework which is equipped with support members to engage lifting points on the underside of a helicopter. The support members are configured in such a way as to permit longitudinal and lateral adjustment in order to fit various helicopters and to adjust the location of the helicopter's center of gravity in relation to the single lifting arm, thus permitting the ability to balance the aircraft on the lifting dolly. It is a central concept of this invention that helicopters are inherently well-balanced aircraft, and that different examples of the same model helicopter will have a center of gravity in approximately the same place in relationship to the fuselage, and thus in relationship to the lifting points.

Attached to the rear of the central frame is a handle that is offset from the longitudinal axis of the dolly to permit maneuvering the dolly under a helicopter and a hand held pendulum control attached to the dolly by means of a flexible electrical cable. It is a feature of this invention that the operator rolls the dolly under the helicopter from the rear of the fuselage. Motive power can be provided by the single powered wheel, or the operator can roll the dolly manually in the loading operation. The offset handle mounted on the rear of the dolly permits the operator to maneuver the dolly without the tailboom of the helicopter getting in the way, and the casters permit a high level of maneuverability.

When the dolly is in position under the helicopter, the operator pushes the "up" button on the hand held control, raising the lifting framework to engage suitable lifting points on the underside of the helicopter. The control is remotely locatable from the dolly and gives the operator the ability to walk around the aircraft, insuring that all lifting points are properly engaged as the lifting framework is being raised. When all lifting points are engaged, the operator, control still in hand, steps back to the end of the tailboom to stabilize the helicopter as the skids are lifted off the ground. It is a feature of this invention that the lifting framework is supported by the lifting arm in such a way that the helicopter is approximatley balanced on its center of gravity, thus requiring minimal effort to stabilize the pitch of the aircraft.

Once the helicopter is raised off the ground, the operator pushes either "forward" or "reverse" on the pendulum control and the dolly moves the helicopter. The operator steers from a position near the rear of the tailboom, and can maneuver the helicopter equally well in forward or reverse.

Further objects, features, advantages of the invention will be apparent from the following detailed description taken in conjunction with the accompanying drawings.

BRIEF DESCRIPTION OF THE DRAWINGS

FIG. 5 is a schematic overhead view of a portion of the jacking system.

FIG. 6 shows a detail of the hand held control.

DETAILED DESCRIPTION OF THE INVENTION

Figure 1:
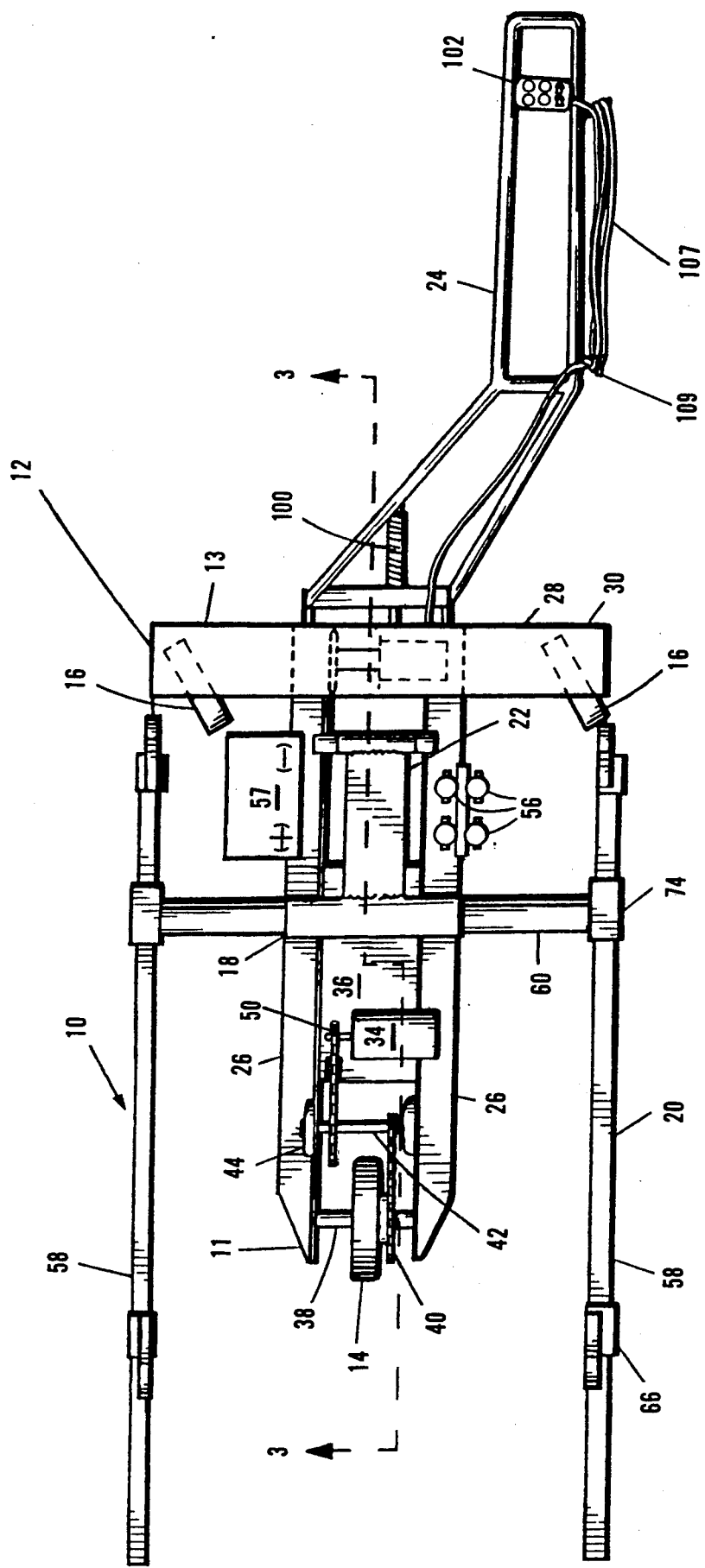
FIG. 1 is an overhead view of the helicopter dolly of the present invention.
Figure 2:
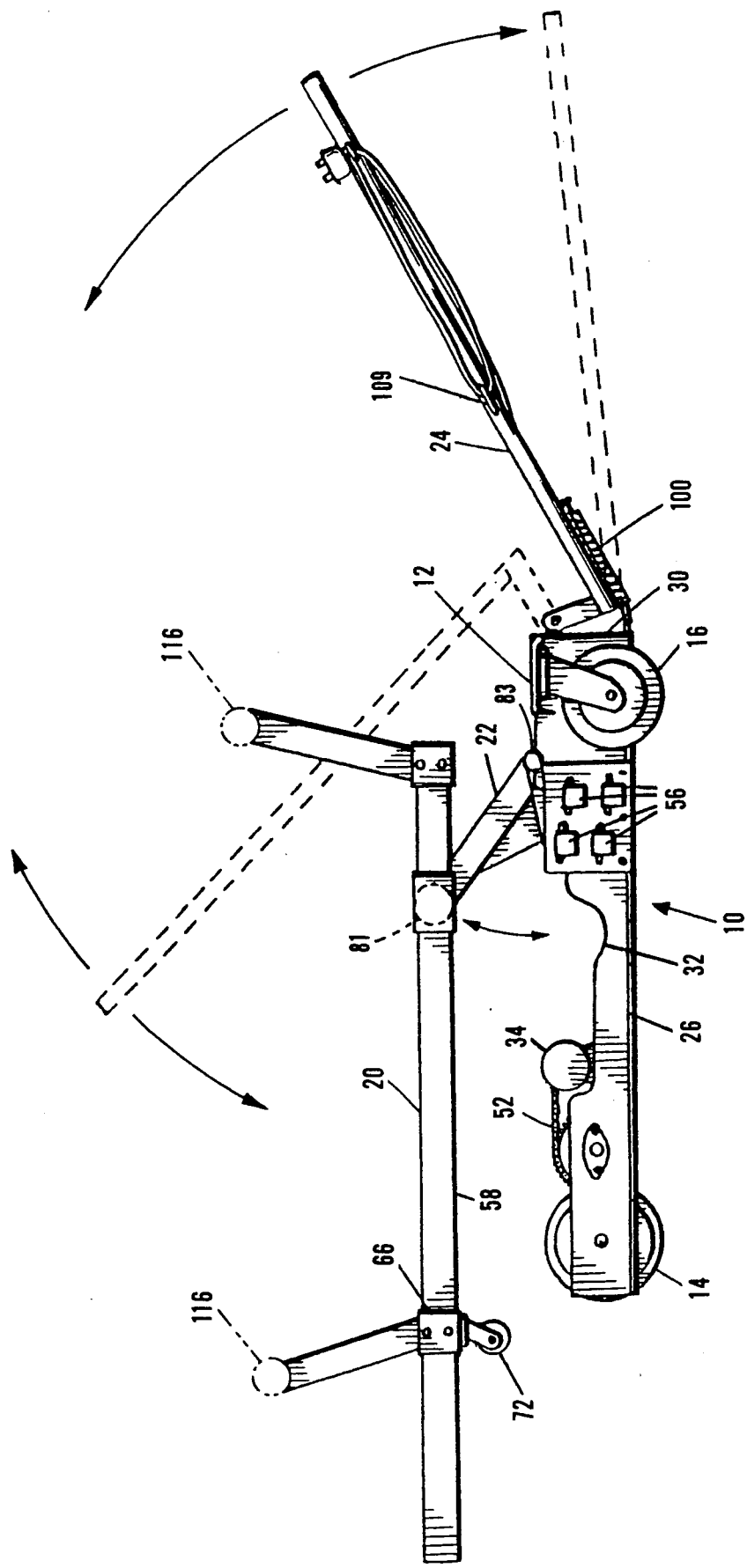
FIG. 2 is a side elevation view of the helicopter dolly of the present invention.
Figure 3:
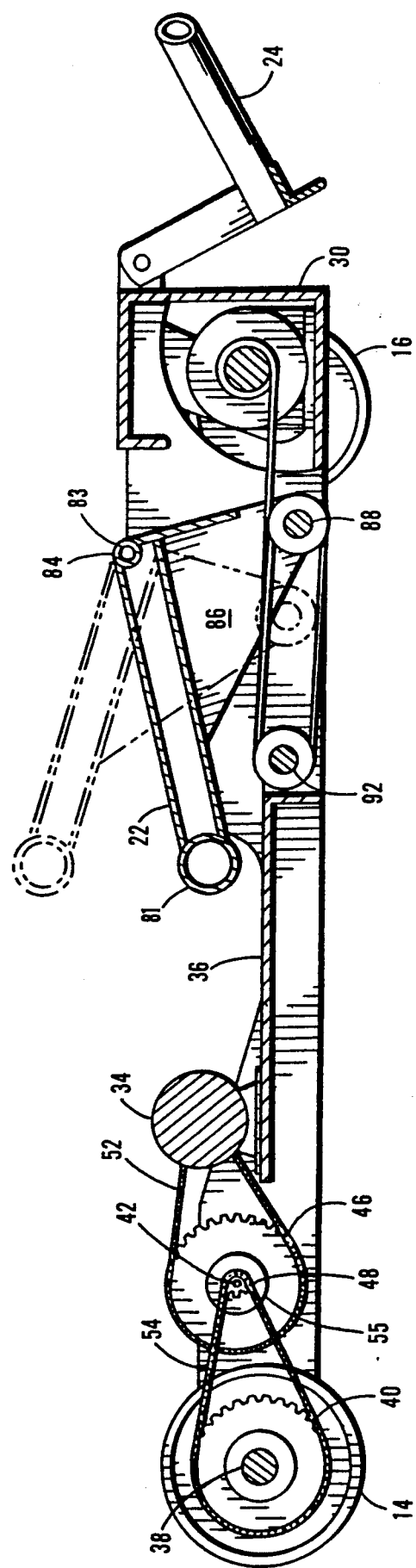
FIG. 3 shows a section view along line 3—3 of FIG. 1 showing the dolly without the lifting framework.

With reference to the drawings, a helicopter dolly in accordance with the present invention is shown generally at 10 in FIGS. 1, 2, and 3. The dolly 10 comprises a chassis or central framework 12, a drive wheel 14, two swivel wheels or casters 16, a jacking sytem 18 that includes a lifting framework 20 and a lifting arm 22, and a handle 24.

The central framework 12 is generally T-shaped as viewed from above in FIG. 1, including two parallel support members 26 made of heavy angle iron and a cross member 28 made of channel iron. The central framework 12 has a front end 11 and a rear end 13 that oppose each other in a longitudinal orientation. The rear end 13 of the framework 12, corresponding to the top of the "T," is capped with plate steel 30 to provide rigidity to the central framework 12 and to provide a mounting surface for the handle 24. The parallel support members 26 are cut out at 32 as viewed in FIG. 2 from the side to provide clearance for an electric motor 34 and the lifting arm 22. A flat steel plate 36 is welded horizontally between the parallel support members 26 to reinforce the central framework 12 and to provide a mounting surface for elements of the jacking system 18, as is described in greater detail below.

Mounted horizontally and transversely between the parallel support members 26 near the front of the central framework 12 is an axle 38 on which rotates the drive wheel 14 which is equipped with a chain sprocket 40. As best viewed in FIG. 3, behind the drive wheel 14 and the associated axle 38 is a parallel axle 42 rotatably mounted upon bearings 44. A large chain sprocket 46 and a small chain sprocket 48 are installed upon the axle 42. The electric motor 34 is mounted further to the rear of the axle 42 and is equipped with a small chain sprocket 50 on the drive shaft of the electric motor 34. A chain 52 transmits rotation from the sprocket 50 of the electric motor 34 to the large sprocket 46, and a chain 54 transmits rotation from the small sprocket 48 to the sprocket 40, thus establishing a chain drive transmission system of a conventional nature to drive the drive wheel 14. It is an important feature of the previously described transmission system that it be equipped with a device known as a "torque limiter" 55 (for example, Morse part #250A) on the axle 42. The torque limiter 55 introduces some slippage into the transmission system when high starting torque is encountered to prevent jerkiness of the dolly 10 when the motor 34 is activated and to prevent damage to the dolly 10 or helicopter when the motor is reversed suddenly. It should be noted that the drive system counld be embodied in many different ways, including utilization of a gear motor, periphery drive of the drive wheel, hydraulic pump and motor, or a planetary gear system.

Also mounted on the central framework 12 is a battery 57 of the lead-acid automotive type, and a solenoid relay assembly 56 that is essentially a pair of double pole double throw (DPDT) dc relay switches that control the motive power and lifting power for the jacking system 18 in a conventional manner as is well known. Except for a unique hand-held control that permits the operator to control lifting and motive action of the invention, no electrical features or wiring are described or pictured herein, as they are of a conventional nature and well known.

Mounted on the underside and at each end of the framework cross member 28 are the swivel wheels or casters 16. The casters 16 are of sufficient size to provide ground clearance for the dolly 10, and are separated by sufficient distance from each other to give, in conjunction with the single drive wheel 14, a relatively stable three-point support to the dolly 10.

Figure 4:
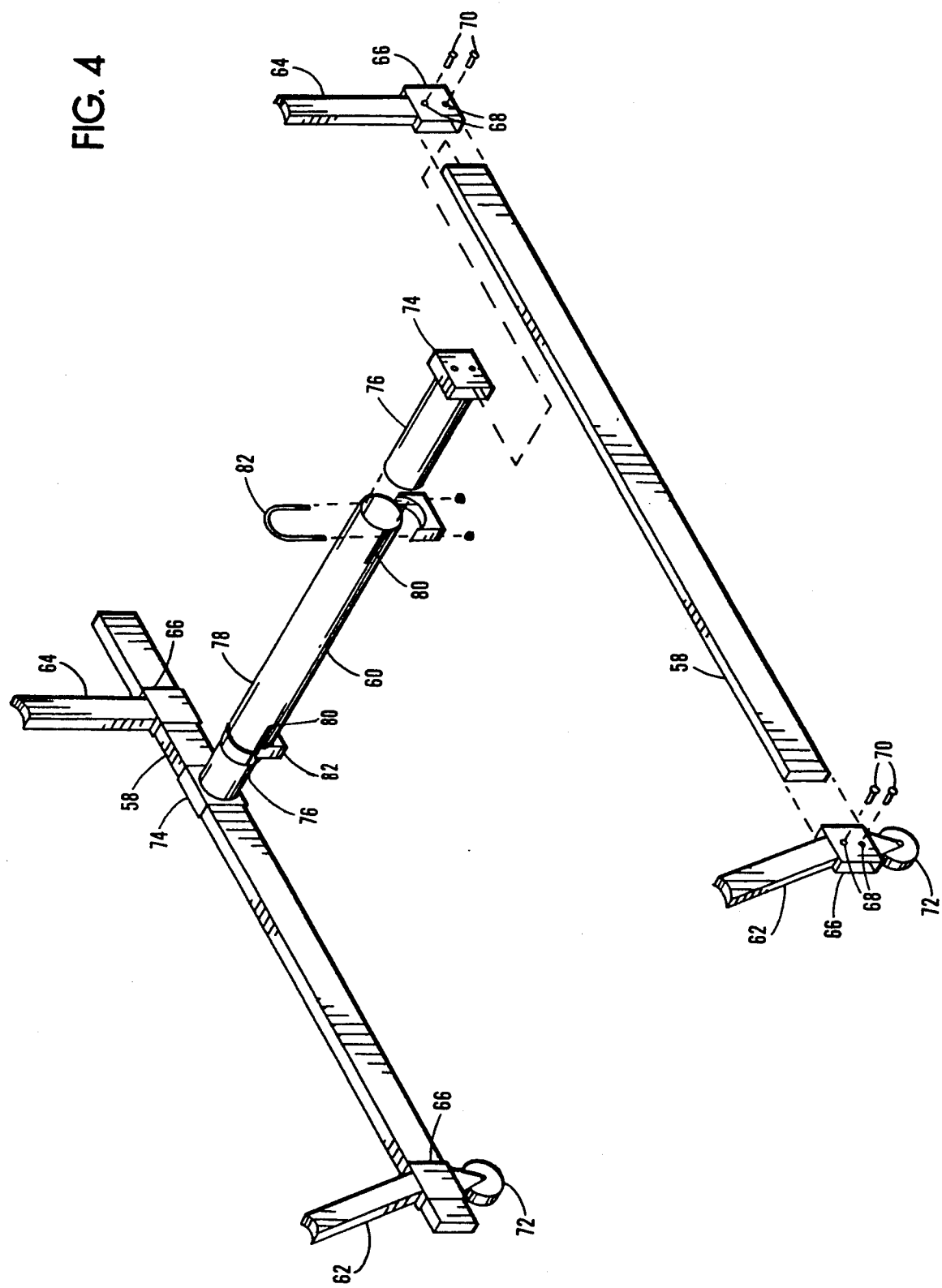
FIG. 4 is a partially exploded view of the lifting framework.

The jacking system 18 includes the lifting framework 20 and the lifting arm 22. FIG. 4 shows an exploded detail of the lifting framework 20. The lifting framework is "H" shaped, having two parallel beams 58 and a transverse beam 60 oriented perpendicular to the parallel beams 58. A front support member 62 and a rear support member 64 is attached to, and extends upward from, each of the parallel beams 58. The parallel beams 58 are formed of rectangular tubing capable of supporting the weight of the helicopter, and long enough to position the support members 62 and 64 under suitable lifting points of a helicopter. The upper ends of the support members 62 and 64 ar concavely shaped to receive suitable lifting points of the helicopter. The support members 62 and 64 have a sleeve 66 at their lower ends, the inside dimensions of the sleeves 66 corresponding to the outside dimensions of the parallel beams 58 in such a way that the sleeves 66 fit over their respective parallel beams 58 and can be slid to any position along the length of their respective parallel beam 58. In the embodiment as depicted, each of the sleeves 66 are equipped with a means for locking the sleeve 66 in a position on the parallel beam 58, namely two threaded holes 68 in which are screwed locking bolts or screws 70 that press against the lifting beam and effectively prevent movement of the sleeve 66 along the length of the parallel beam 58. In alternate embodiments, other means could be effectively used with the same results. For example, a cam action device could pass through holes in the sleeve 66 and parallel beam 58, thus locking the parts in relation to each other. The front support members 62 are equipped with a fixed caster or wheel assembly 72 welded to the bottom of the sleeve 66 in order to prevent the lifting framework 20 from skidding or scraping on the ground when the lifting framework 20 is lowered and not engaged with the helicopter, as explained below.

The transverse beam 60 has a sleeve 74 welded to each end of the beam 60, the sleeves 74 being of the same size as the sleeves 66 and also sharing the same locking features. The beam 60 can therefore be slid and locked in position along the length of the parallel beams 58 in the same manner that the support members 62 and 64 are slid and locked along the length of the parallel beams 58. The transverse beam 60 comprises inner tubes 76 near the ends of the transverse beam 60 and an outer tube 78 in the middle of the transverse beam 60. The inner tubes 76 slide in and out of the outer tube 78 so that the length of the transverse beam 60 may be adjusted by a telescoping action. The outer tube 78 has two or more slits 80 cut longitudinally in the ends of the outer tube 78 to permit compressing of the outer tube 78 by U-bolt clamps 82. When tightened, the U-bolt clamps 82 firmly clamp the outer tube 78 to the inner tubes 76. The telescoping arrangement of the tubes 76 and 78 permits easy adjustment of the width of the lifting framework 20 to accommodate the skids of different helicopters. The telescoping arrangement of the tubes 76 and 78, and the sliding of the sleeves 66 to alter the positions of the support members 62 and 64, permits adjustment of the distance between the support members 62 and 64 both laterally and longitudinally. The sliding of the sleeves 74 to adjust the position of the transverse beam 60 along the length of the parallel beams 58 permits adjustment of the balance of the lifting framework 20 in relationship to the transverse beam 60.

The lifting arm 22 is "L" shaped, with a lateral tube 80 at what would be the top of the "L" in which the transverse tube rotates, a second lateral tube 82 located at the "heel" of the "L" which permits the lifting arm to move pivotally in relation to an axle 84 fixedly mounted transversely at the top of the central framework 12, and two parallel, longitudinally oriented triangular shaped rigid plates 86 forming the "foot" of the "L", between which, in a position corresponding to the "toe" of the "L" shaped lifting equipment, is a laterally positioned axle 88 on which turn multiple cable sheaves (pulleys) 90 shown schematically in FIG. 5. The transverse beam 60 of the lifting framework 20 is inserted through the lateral tube 80 to mount the lifting framework 20 upon the lifting arm 22. When a helicopter is lifted with the dolly of the present invention, the lifting arm 22 must be strong enough to bear not only the weight of the helicopter, but also the significant dynamic torsional stresses placed on the lifting arm. For this reason, the structural element between the tube 80 and tube 82 must have not only high bending strength, but must be torsionally rigid, such as tubular structural steel.

Mounted on the flat steel plate 36 between the parallel frame members 26, is an axle 92, on which roll a multiple of cable sheaves 94 as shown in FIG. 5. A cable 96 is strung in a block-and-tackle configuration as is well known, between the two sets of sheaves 90 and 94. Power for this block-and-tackle configuration is provided by a compact winch 98 of the type that is commonly available such as the Superwinch X-1, which is mounted between the parallel support members 26 and underneath the cross member 28 of the central framework 12. As the winch 98 takes in the cable 96, tension is created between the axle 88 and the axle 92. Since axle 92 is rigidly attached to the central framework 12, and the axle 88 is attached to the lifting arm 22, which is free to pivot, the lifting arm 22 pivots on the axle 84 and raises the lifting framework 20 and thus the load of the helicopter. Likewise, when the winch 98 lets the cable 96 out, the tension between the sets of sheaves 90 and 94 is relieved and the lifting arm 22 lowers. The winch 98, in combination with the lifting arm 22 and the block-and-tackle configuration, serve as means for raising and lowering the lifting framework 20. Notable features of the aforedescribed jacking system 18 include the ability to vary the lifting force (and inversely the lifting speed) by varying the number of sheaves in the block-and-tackle configuration, the ability to easily control the up and down motion of the lifting arm 22 electrically by simply reversing the polarity of the dc current to the winch 98, and the ability to have "self-locking" feature of the jacking system 18 by shunting across the terminals on the winch 98 as is commonly known. It is further noted that a hydraulic system or other lifting system could be utilized in a different embodiment of the invention with no diminishment of the utility of the invention.

The handle 24 is used only for maneuvering the dolly 10 when it is not loaded. Once the dolly 10 is loaded with the helicopter, the operator controls direction from a position near the end of the tailboom. The handle 24 is mounted on the rear of the dolly 10 in such a manner that it pivots on a horizontal transverse axis, and that lateral force on the handle 24 causes castering action by the casters 16 and the entire dolly 10 moves. It is a feature of the handle that it is offset from a longitudinal center of the dolly 10. This is important to eliminate interference with the tailboom of a helicopter when loading since the present invention is designed to load from the rear of a helicopter. It is a further feature of the handle 24 that it is equipped with a spring loaded plunger 100 which contacts the rear of the dolly 10 when the handle 24 is at a convenient operating height to hold it in said position, but as the handle 24 is pushed down, the plunger 100 compresses the spring and permits the handle 24 to be lowered to avoid antennas or other appendages on the tailboom or the tailboom itself. When downward pressure is removed from the handle, the spring and plunger 100 causes the handle 24 to resume its normal position. When not in use, the handle 24 pivots on its lateral mounting axis and folds forward over the dolly 10 to a position essentially horizontal.

FIG. 6 shows a detail of a hand held control 102 for use in association with the dolly 10. The control 102 consists of push-button switches 104, 106, 108, and 110 to control up and down motion of the jacking system 18, and forward and reverse motion of the drive system, respectively. The hand held control 102 also includes switches 103 and 105 of various types to provide a general on/off function, vary speed of the electrical components, or provide safety interlock features (not pictured). The aforementioned electrical components are connected in a conventional manner to a flexible multi-conductored electrical cable 107 long enough to permit the operator to stand remotely locatable from the dolly 10 in a postion near the end of the tailboom, the cable 107 being supported by the handle and terminates at appropriate electrical compenents mounted on the dolly 10. The aforementioned handle 24 is equipped with rigid appendages 109 suitable to coil or wrap the cable 108 when it is not in use, and the hand-held control 102 is equipped with a magnet (not pictured) to hold it on the handle 24 when it is not in use.

Figure 7:
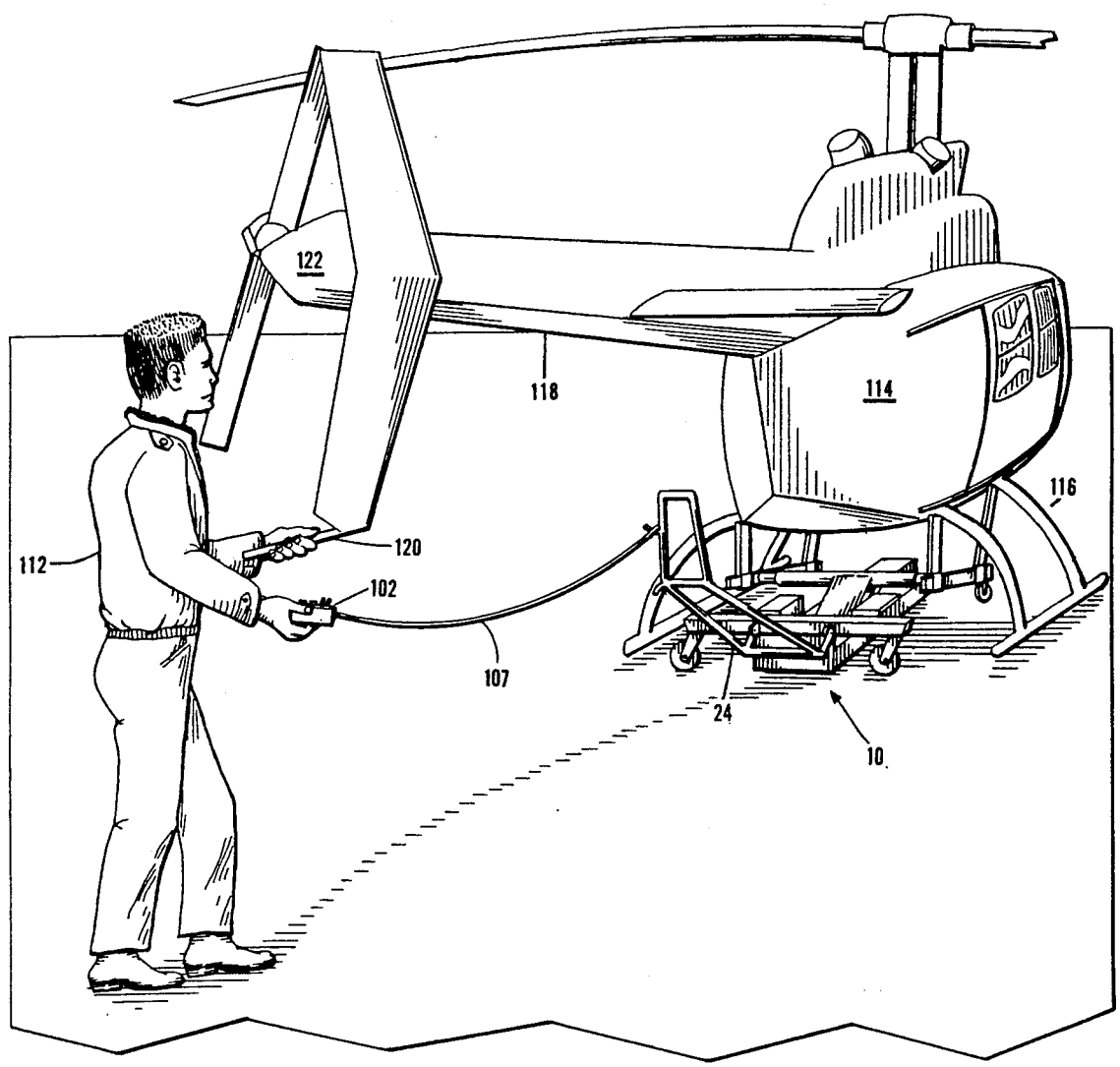
FIG. 7 is a perspective view illustrating the invention in position under a typical skid-equipped helicopter with the operator in position to move the aircraft.

In the operation of the dolly 10, an operator 112 grasps the handle 24 and manuevers the dolly 10 underneath a helicopter 114 by rolling the dolly 10 in position from the rear of the helicopter 114. The dolly 10 is moved into position by the drive wheel 14, or the operator 112 can roll the dolly manually in the loading operation. Forward and reverse motion of the dolly 10 by the drive wheel 14 is accomplished through the hand held control 102. The support members 62 and 64 are adjusted to be positioned upon the parallel beams 58 in such a manner that they will engage with the lifting points on the crosstubes 116 of the helicopter 114, struts or other suitable location on the underside of the helicopter 114. The transverse beam 60 is positioned upon the parallel beams 58 in such a manner that the center of gravity of the helicopter 114 is located directly above the center of the transverse beam 60. The control 102 is remotely locatable from the dolly 10 and gives the operator the ability to walk around the helicopter 114, to insure that all lifting points are properly engaged as the lifting framework 20 is raised. When the dolly 10 is in position under the helicopter 114, the lifting framework 20 is raised so that the support members 62 and 64 are properly engaged with appropriate lifting points (e.g., crosstubes 116) of the helicopter 114. Controls of the hand held control 102 are manipulated to raise the lifting framework 20 via the lifting arm 22 and the winch 98. FIG. 7 shows the dolly 10 in position under the helicopter 114 with the helicopter 114 elevated and ready to move. The operator 112 moves to a position with control 102 in one hand near the end of a tailboom 118 of the helicopter 114, having rolled the dolly 10 in position from the rear of the helicopter 114. The operator 112 stabilizes the fore/aft pitch of the helicopter by grasping a suitable appendage 120 of the tailboom 118 variously referred to as the stinger, anti-torque rotor guard, rear skid, or a portion of the tailboom 118 itself such as the rear rotor gear box or mounting assembly 122 with the other hand.

The helicopter 114, lifted with the aforedescribed dolly 10, thus teeters on the jacking system 18 in respect to a lateral axis (transverse to the longitudinal orientation of the opposition of the front ends and rear ends), but is rigid in respect to a longitudinal axis, i.e., it is permitted to pitch fore and aft, but not to roll side to side due to the high torsional strength of the lifting arm 22. The helicopter 114 is sufficiently balanced on a lateral axis upon the lifting framework 20 such that the fore/aft pitch is controllable by the operator 12. The helicopter 114 is also fixed in relationship to yaw, or movement around a vertical axis, with this arrangement. Since the operator 112 is holding on to the helicopter 114 at a point near the end of the tailboom 116, and the three wheeled configuration with casters permits pivoting action on the single drive wheel 14, steering can be accomplished very easily by simply pushing the tailboom to the left or right, and the helicopter 114 can be turned around in a minimum of space. The helicopter 114 is moved forward and backward by the drive wheel 14 as controlled by switches 108 and 110 of the hand held control 102.

It is understood that the invention is not confined to the particular construction and arrangement of parts herein illustrated and described, but embraces such modified forms thereof as come within the scope of the following claims.

What is claimed is:

1. A dolly for ground transport of a helicopter having an underside with attached crossbars or other suitable lifting points and a tailboom, the dolly comprising:
   (a) a chassis having a front end and a rear end that oppose each other in a longitudinal orientation, the chassis having a wheel arrangement that consists of a drive wheel mounted proximate the front end and two swivel wheels mounted proximate the rear end that are spaced apart to form a three point support on which the chassis is capable of movement;
   (b) a lifting frame that is attached to the chassis and is capable of being raised and lowered, the lifting frame having support members capable of engaging with the crossbars or other suitable lifting points on the underside of a helicopter to lift the helicopter off of the ground;
   (c) means for raising and lowering of the lifting frame;
   (d) a handle that is attached to the rear end of the chassis; and
   (e) a control that is connected to control the drive wheel to move the dolly forward and backward and that is connected to control the means for raising and lowering the lifting frame to raise and lower the lifting frame.

2. The dolly of claim 1 wherein the lifting frame is attached to the chassis by an arm that supports the lifting frame such that the lifting frame is pivotable transverse to the longitudinal orientation of the front and rear ends and the helicopter is capable of being lifted and balanced to have a fore/aft pitch controllable by an operator grasping the tailboom of the helicopter.

3. The dolly of claim 1 wherein the support members of the lifting frame are adjustable to engage with crossbars or other suitable lifting points on the undersides of different helicopter types.

4. The dolly of claim 1 wherein the lifting frame is attached to the chassis by an arm that supports the lifting frame and the means for raising and lowering the lifting frame is a winch mounted upon the chassis that forms a part of a block-and-tackle arrangement with the lifting arm.

5. The dolly of claim 1 wherein the handle is offset from the longitudinal axis of the chassis such that the dolly may be approached from the rear of the helicopter and the handle does not interfere with the tailboom.

6. The dolly of claim 1 wherein the control is remotely locatable from the dolly.

7. A dolly for ground transport of a helicopter having an underside with attached crossbars or other suitable lifting points and a tailboom, the dolly comprising:
   (a) a chassis having a front end and a rear end that oppose each other in a longitudinal orientation, the chassis having a wheel arrangement mounted thereon upon which the chassis is capable of movement, the wheel arrangement having at least one drive wheel;
   (b) a lifting frame that is attached to the chassis and is capable of being raised and lowered, the lifting frame having support members capable of engaging with the crossbars or other suitable lifting points on the underside of a helicopter to lift the helicopter off of the ground, the lifting frame being attached to the chassis by an arm that supports the lifting frame such that the lifting frame is pivotable transverse to the longitudinal orientation of the front and rear ends and balanced to have a fore/aft pitch controllable by an operator grasping the tailboom of the helicopter;
   (c) means for raising and lowering of the lifting frame;
   (d) a handle that is attached to the rear end of the chassis; and
   (e) a control that is connected to control the drive wheel to move the dolly forward and backward and that is connected to control the means for raising and lowering the lifting frame to raise and lower the lifting frame.

8. The dolly of claim 7 wherein the wheel arrangement of the chassis includes a drive wheel mounted proximate the front end and two swivel wheels mounted proximate the rear end that are spaced apart to form a three point support on which the chassis is capable of movement.

9. The dolly of claim 7 wherein the support members of the lifting frame are adjustable to engage with crossbars or other suitable lifting points on the undersides of different helicopter types.

10. The dolly of claim 7 wherein the lifting frame is attached to the chassis by an arm that supports the lifting frame and the means for raising and lowering the lifting frame is a winch mounted upon the chassis that forms a part of a block-and-tackle arrangement with the lifting arm.

11. The dolly of claim 7 wherein the handle is offset from the longitudinal axis of the chassis such that the dolly may be approached from the rear of the helicopter and the handle does not interfere with the tailboom.

12. The dolly of claim 7 wherein the control is remotely locatable from the dolly.

13. A dolly for ground transport of a helicopter having an underside with attached crossbars or other suitable lifting points and a tailboom, the dolly comprising:
   (a) a chassis having a front end and a rear end that oppose each other in a longitudinal orientation, the chassis having a wheel arrangement mounted thereon upon which the chassis is capable of movement;
   (b) an arm pivotally mounted to the chassis;
   (c) a lifting frame which has two spaced parallel beams connected by a transverse tube, wherein the transverse tube is rotatable mounted to the arm, the lifting frame being capable of being raised and lowered and the lifting frame having support members mounted on the parallel beams capable of engaging with the crossbars or other suitable lifting points on the underside of a helicopter to lift the helicopter off of the ground;
   (d) a winch that is mounted upon the chassis to form a block-and-tackle arrangement with the lifting arm to raise and lower the lifting frame;
   (e) a handle that is attached to the rear end of the chassis; and
   (f) a control that controls the drive wheel to move the dolly forward and backward and that controls the winch to raise and lower the lifting frame.

14. The dolly of claim 13 wherein the wheel arrangement of the chassis includes a drive wheel mounted proximate the front end and two swivel wheels mounted proximate the rear end that are spaced apart to form a three point support on which the chassis is capable of movement.

15. The dolly of claim 13 wherein the lifting frame is attached to the chassis by an arm that supports the lifting frame such that the lifting frame is pivotable transverse to the longitudinal orientation of the front and rear ends and the helicopter is capable of being lifted and balanced to have a fore/aft pitch controllable by an operator grasping the tailboom of the helicopter.

16. The dolly of claim 13 wherein the support members are selectively fixable to the parallel beams and slideably engaged thereon to allow positional adjustment along the parallel beams, and the transverse tube is comprised of inner tubes mounted to the parallel beams which telescope within an outer tube mounted to the arm to adjustably space the parallel beams, such that the support members of the lifting frame are adjustable to engage with crossbars or other suitable lifting points on the undersides of different helicopter types.

17. The dolly of claim 13 wherein the handle is offset from the longitudinal axis of the chassis such that the dolly may be approached from the rear of the helicopter and the handle does not interfere with the tailboom.

18. The dolly of claim 13 wherein the control is remotely locatable from the dolly.

19. A dolly for ground transport of a helicopter having an underside with attached crossbars or other suitable lifting points and a tailboom, the dolly comprising:
   (a) a chassis having a front end and a rear end that oppose each other in a longitudinal orientation, the chassis having a wheel arrangement mounted thereon upon which the chassis is capable of movement;
   (b) an arm pivotally mounted to the chassis;
   (c) a lifting frame which has two spaced parallel beams connected by a transverse tube, wherein the transverse tube is rotatably mounted to the arm, the lifting frame being capable of being raised and lowered, the lifting frame having support members mounted on the parallel beams capable of engaging with the crossbars or other suitable lifting points on the underside of a helicopter to lift the helicopter off of the ground;
   (d) means for raising and lowering of the lifting frame;
   (e) a handle that is attached to the rear end of the chassis and that is offset from the longitudinal axis of the chassis such that the dolly may be approached from the rear of the helicopter and the handle does not interfere with the tailboom; and
   (f) a control that is connected to control the drive wheel to move the dolly forward and backward and that is connected to control the means for raising and lowering the lifting frame to raise and lower the lifting frame.

20. The dolly of claim 19 wherein the wheel arrangement of the chassis includes a drive wheel mounted proximate the front end and two swivel wheels mounted proximate the rear end that are spaced apart to form a three point support on which the chassis is capable of movement.

21. The dolly of claim 19 wherein the lifting frame is attached to the chassis by an arm that supports the lifting frame such that the lifting frame is pivotable transverse to the longitudinal orientation of the front and rear ends and the helicopter is capable of being lifted and balanced to have a fore/aft pitch controllable by an operator grasping the tailboom of the helicopter.

22. The dolly of claim 19 wherein the support members of the lifting frame are adjustable to engage with crossbars or other suitable lifting points on the undersides of different helicopter types.

23. The dolly of claim 19 wherein the control is remotely locatable from the dolly.

24. A dolly for ground transport of a helicopter having crossbars or other suitable lifting points, the dolly comprising:
   (a) a chassis having a front end and a rear end that oppose each other in a longitudinal orientation, the chassis having a wheel arrangement mounted thereon upon which the chassis is capable of movement;
   (b) a lifting frame that is attached to the chassis and is capable of being raised and lowered, the lifting frame having support members capable of engaging with the crossbars or other suitable lifting points on the underside of a helicopter to lift the helicopter off of the ground;
   (c) means for raising and lowering of the lifting frame;
   (d) a handle that is attached to the rear end of the chassis and that is offset from the longitudinal axis of the chassis such that the dolly may be approached from the rear of the helicopter and the handle does not interfere with the tailboom;

(e) a control that is connected to control the drive wheel to move the dolly forward and backward and that is connected to control the means for raising and lowering the lifting frame to raise and lower the lifting frame; and (f) wherein the lifting frame is attached to the chassis by an arm that supports the lifting frame and the means for raising and lowering the lifting frame is a winch mounted upon the chassis that forms a part of a block-and-tackle arrangement with the lifting arm.

25. A dolly for ground transport of a helicopter having an underside with attached crossbars or other suitable lifting points and a tailboom, the dolly comprising:

(a) a chassis having a front end and a rear end that oppose each other in a longitudinal orientation, the chassis having a wheel arrangement mounted thereon upon which the chassis is capable of movement;

(b) an arm pivotally mounted to the chassis;

(c) a lifting frame which has two spaced parallel beams connected by a transverse tube, wherein the transverse tube is rotatably mounted to the arm, and the lifting frame is capable of being raised and lowered, the lifting frame having support members mounted on the parallel beams capable of engaging with the crossbars or other suitable lifting points on the underside of a helicopter to lift the helicopter off of the ground;

(d) means for raising and lowering of the lifting frame;

(e) a handle that is attached to the rear end of the chassis; and (f) a control that controls the drive wheel to move the dolly forward and backward and that controls the means for raising and lowering the lifting frame to raise and lower the lifting frame, the control being remotely locatable from the dolly.

26. The dolly of claim 25 wherein the wheel arrangement of the chassis includes a drive wheel mounted proximate the front end and two swivel wheels mounted proximate the rear end that are spaced apart to form a three point support on which the chassis is capable of movement.

27. The dolly of claim 25 wherein the lifting frame is attached to the chassis by an arm that supports the lifting frame such that the lifting frame is pivotable transverse to the longitudinal orientation of the front and rear ends and the helicopter is capable of being lifted and balanced to have a fore/aft pitch controllable by an operator grasping the tailboom of the helicopter.

28. The dolly of claim 25 wherein the support members of the lifting frame are adjustable to engage with crossbars or other suitable lifting points on the undersides of different helicopter types.

29. The dolly of claim 25 wherein the lifting frame is attached to the chassis by an arm that supports the lifting frame and the means for raising and lowering the lifting frame is a winch mounted upon the chassis that forms a part of a block-and-tackle arrangement with the lifting arm.

30. The dolly of claim 25 wherein the handle is offset from the longitudinal axis of the chassis such that the dolly may be approached from the rear of the helicopter and the handle does not interfere with the tailboom.

31. A dolly for ground transport of a helicopter having crossbars or other suitable lifting points, the dolly comprising:

(a) a chassis having a front end and a rear end that oppose each other in a longitudinal orientation, the chassis having a wheel arrangement that consists of a drive wheel mounted proximate the front end and two swivel wheels mounted proximate the rear and that are spaced apart to form a three point support on which the chassis is capable of movement;

(b) a lifting frame that is attached to the chassis and is capable of being raised and lowered, the lifting frame having support members capable of engaging with the crossbars or other suitable lifting points on the underside of a helicopter to lift the helicopter off of the ground, the lifting frame being attached to the chassis by an arm that supports the lifting frame such that the lifting frame is pivotable transverse to the longitudinal orientation of the front and rear ends and balanced to have a fore/aft pitch controllable by an operator grasping the tailboom of the helicopter;

(c) a winch that is mounted upon the chassis to form a block-and-tackle arrangement with the lifting arm to raise and lower the lifting frame;

(d) a handle that is attached to the rear end of the chassis and that is offset from the longitudinal axis of the chassis such that the dolly may be approached from the rear of the helicopter and the handle does not interfere with the tailboom; and (e) a control that controls the drive wheel to move the dolly forward and backward and that controls the winch to raise and lower the lifting frame, the control being remotely locatable from the dolly.

* * * * *